United States Patent [19]

Fein

[11] 3,910,976
[45] Oct. 7, 1975

[54] HALO DERIVATIVES OF VANADIUM ORGANOPHOSPHATES

[75] Inventor: Marvin Michael Fein, Westfield, N.J.

[73] Assignee: Dart Industries Inc., Los Angeles, Calif.

[22] Filed: Feb. 28, 1974

[21] Appl. No.: 446,860

Related U.S. Application Data

[63] Continuation-in-part of Ser. No. 169,103, Aug. 4, 1971, abandoned.

[52] U.S. Cl.......... 260/429 R; 252/431 P; 260/94.3; 260/94.9 B; 260/429.9; 260/502.4 R; 260/966
[51] Int. Cl.²......................................... C07F 9/09
[58] Field of Search .............. 260/429 R; 252/431 P

[56] References Cited
UNITED STATES PATENTS

| | | | |
|---|---|---|---|
| 2,951,086 | 8/1960 | Chadwick | 260/429 R |
| 3,087,950 | 4/1963 | Burnop | 260/429 R |
| 3,290,342 | 12/1966 | Stern et al. | 260/429 R |
| 3,595,890 | 7/1971 | Huerta et al. | 260/429 R |

Primary Examiner—Arthur P. Demers
Attorney, Agent, or Firm—Arthur S. Collins; Bryant W. Brennan; Margareta Lemaire

[57] ABSTRACT

A composition having the general formula:

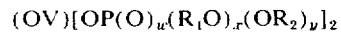

wherein OV is a vanadyloxy group, $R_1$ is hydrogen, an alkyl or cycloalkyl having 1 to 16 carbon atoms or an aryl having up to 16 carbon atoms, $R_2$ is a haloalkyl, pseudohaloalkyl, halocycloalkyl or pseudohalocycloalkyl having 1 to 16 carbon atoms or a haloaryl or pseudohaloaryl having up to 16 carbon atoms, the halo is fluoro, chloro, iodo or bromo, the pseudohalo is cyano, cyanato or hydroxyl, $w$ has a value of 0 or 1, $x$ has a value of 0 or 1, $y$ has a value of 1 or 2 and the sum of $x$ and $y$ is 2, forms an active vanadium coordination catalyst on being combined with an organoaluminum halide. A particularly effective catalyst for the production of EP and EPDM rubber is vanadyl di-2-chloroethyl phosphate and an organoaluminum chloride.

13 Claims, No Drawings

HALO DERIVATIVES OF VANADIUM ORGANOPHOSPHATES

This application is a continuation-in-part of U.S. Ser. No. 169,103, Filed Aug. 4, 1971, now abandoned.

BACKGROUND OF THE INVENTION

1. Field of the Invention

This invention is directed to halo and pseudohalo derivatives of vanadium organophosphate compositions and processes for their synthesis. The compositions of this invention form active vanadium coordination catalysts when combined with organoaluminum compounds for the preparation of polymers of alpha-olefins and copolymers of alpha-olefins and terpolymers of alpha-olefins and a non-conjugated diene.

2. Description of the Prior Art

U.S. Pat. No. 3,595,890 to Huerta et al. discloses vanadium organophosphate compositions and polymers of such compositions represented by formulae such as:

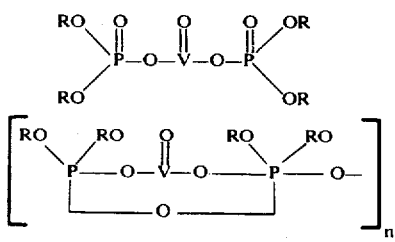

and

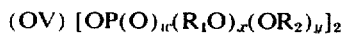

wherein $n$ is 2 to 6 and R is an alkyl or an alkyl ether having 1 to 16 carbon atoms or an aryl having up to 16 carbon atoms, or mixtures thereof. Said patent explains and documents the strong natural tendency for vanadium organophosphates of the basic structure shown in the first of the above formulae to polymerize into larger molecules such as those represented by the second of the above formulae. Such vanadium organophosphate compositions were disclosed to form active vanadium coordination catalysts when combined with an organoaluminum compound. The present invention is an improvement over the compositions disclosed in this patent, which patent is incorporated herein by reference.

SUMMARY OF THE INVENTION

The present invention resides in a modification and improvement of the compositions disclosed in U.S. Pat. No. 3,595,890, in which a halo-group or pseudohalo-group is present in at least one OR group on each phosphorous atom and which preferably is beta to the oxygen of said OR group. This results in a catalyst component which has a lower induction period and a higher yield than these prior art compositions. The induction period is the time required for the initiation of the polymerization reaction.

The present invention provides a composition represented by the formula:

$$(OV) [OP(O)_w(R_1O)_x(OR_2)_y]_2$$

wherein OV is a vanadyloxy group, $R_1$ is hydrogen, an alkyl or cycloalkyl having 1 to 16 carbon atoms or an aryl having up to 16 carbon atoms, $R_2$ is a haloalkyl, pseudohaloalkyl, halocycloalkyl or pseudohalocycloalkyl having 1 to 16 carbon atoms or a haloaryl or pseudohaloaryl having up to 16 carbon atoms, said halo is fluoro, chloro, iodo or bromo, said pseudohalo is cyano, cyanato or hydroxyl, $w$ has a value of 0 or 1, $x$ has a value of 0 or 1, $y$ has a value of 1 or 2 and the sum of $x$ and $y$ is 2.

The composition of this invention can be prepared by reacting a vanadyl salt with a salt of an organophosphorous compound having the formula:

$$M [OP(O)_w(R_1O)_x(OR_2)_y]_2$$

wherein M is beryllium, magnesium, calcium, zinc, strontium, cadmium, barium or mixtures thereof, and $R_1$, $R_2$, $w$, $x$ and $y$ are defined as in the above paragraph. The vanadyl salt must be in its tetravalent form and includes such salts as vanadyl sulfate, vanadyl chloride, vanadyl bromide, vanadyl iodide, vanadyl oxalate or vanadyl acetate, or mixtures of these salts.

Further details of the type of process suitable for preparing the compositions of the present invention can be found in copending Ser. No. 120,752 filed on Mar. 3, 1971, which application is incorporated herein by reference.

The halo or pseudohalo derivatives of the vanadium organophosphate compositions of this invention are reacted with at least one organoaluminum halide reducing component in the presence of an inert liquid organic medium. Representative types of organoaluminum compounds include dialkylaluminum monohalides; alkylaluminum dihalides; and aluminum alkyl, cycloalkyl or aryl sesquihalides. Particularly preferred organoaluminum halide compounds in combination with the vanadium organophosphate reaction products of this invention include diethylaluminum monochloride and ethylaluminum sesquichloride. Other organoaluminum compounds suitable for the coordination catalyst of this invention include methyl, propyl and isobutyl aluminum chlorides. The Al:V molar ratio of the resulting vanadium coordination catalyst is generally in the range of about 1:1 to 20:1.

The vanadium coordination catalysts resulting from compositions of this invention are especially useful in the preparation of polymers of ethylene, propylene and similar alphaolefins having the formula:

$$R-CH=CH_2$$

wherein R is hydrogen or a hydrocarbon radical, particularly a saturated alkyl hydrocarbon radical having 1 to 8 carbon atoms, e.g., 1-butene; 1-hexene; 4-methyl-1-pentene; 1-heptene; 5-methyl-1-hexene; 1-octene; 4-ethyl-1-hexene; 1-nonene; 1-decene, and dienes, e.g., 1,4-butadiene and the like. These catalysts are especially useful in the copolymerization of ethylene and propylene to yield rubbery products and the production of unsaturated, sulfur-vulcanizable, rubberty terpolymers of ethylene and propylene and a nonconjugated diene, e.g., dicyclopentadiene (DCP); methylcyclopentadiene; methylene norbornene (NMB); 1,4-hexadiene; 1,5-cyclooctadiene, or other copolymerizable dienes. The unique features of these vanadium coordination catalysts are high productivity of the catalysts in terms of the amount of product per pound of catalyst, low cost, ease of handling and storage, very high solubility in hydrocarbon solvents, and fast induction time.

PREFERRED EMBODIMENTS OF THIS INVENTION

The formula for preferred compositions of this invention are represented by the formula:

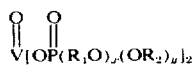

wherein $R_1$ is an alkyl having 1 to 8 carbon atoms, $R_2$ is a β-haloalkyl having 2 to 8 carbon atoms, said halo is fluoro, chloro, iodo, or bromo, $x$ has a value of 0 or 1, $y$ has a value of 1 or 2 and the sum of $x$ and $y$ is 2. Still more preferably $R_1$ is methyl, ethyl, propyl, butyl or mixtures thereof and $R_2$ is β-chloroethyl, β-chloropropyl, β-chlorobutyl, β-bromoethyl, β-bromopropyl, β-bromobutyl or mixtures thereof.

Exemplary compositions that fall within the scope of the foregoing definition of preferred compositions include the following:

vanadyl bis - (di-2-chloroethyl phosphate),
vanadyl bis - (2-chloroethyl ethyl phosphate),
vanadyl bis - (di-2-chloroethyl phosphite),
vanadyl bis - (2-chloroethyl ethyl phosphite),
vanadyl bis - (di-2-bromoethyl phosphate),
vanadyl bis - (2-bromoethyl ethyl phosphate),
vanadyl bis - (di-2-bromoethyl phosphite),
vanadyl bis - (2-bromoethyl ethyl phosphite),
vanadyl bis - (di-2-iodoethyl phosphate),
vanadyl bis - (2-iodoethyl ethyl phosphate),
vanadyl bis - (di-2-iodoethyl phosphite) and
vanadyl bis - (2-iodoethyl ethyl phosphite).

The examples below illustrate the method of preparation of one of the preferred embodiments of the present invention and its use in polymerization.

EXAMPLE 1

Into a 250 ml. glass spherical reactor were charged 20.3 grams of magnesium bis (di-2-chloroethyl) phosphate having the formula:

13.0 grams vanadyl sulfate dihydrate and 17 grams of deionized water. The mixture was stirred at 25°C for 30 minutes to form a blue paste. The paste was extracted with 200 ml. benzene to recover 0.033 grams mol vanadium into the blue organic phase. The organic extract phase was dried over molecular sieves.

The magnesium bis (di-2-chloroethyl) phosphate was prepared by heating a stirred mixture of 50.0 grams of magnesium chloride hexahydrate and 388.7 grams of tris-(2-chloroethyl) phosphate to 167°C. 1,2-Dichloroethane (48.3g.) were condensed from vapors evolved by the reaction. The white solid magnesium salt was filtered from the excess chlorophosphate and washed with benzene and dried in air.

EXAMPLE 2

A stirred glass-bowl reactor was charged with 30 psi of ethylene, 1300 cc of heptane and 320 cc of liquid propylene. During the course of the reaction, the vanadyl bis-(di-chloro-ethyl phosphate) from Example 1 dissolved in 30 cc of benzene to a concentration of 0.0423 grams vanadium and 1.2 grams of ethylaluminum sesquichloride dissolved in 30 cc of n-heptane were continuously metered into the reactor. The reaction mixture was maintained at a temperature of 20°C and a constant pressure of 60 psi with a gas mixture comprising 50 mol percent ethylene and 50 mol percent propylene. The reaction was terminated and the resulting ethylene/propylene copolymer was precipitated out of solution by the addition of an excess amount of isopropyl alcohol after a total reaction time of 35 minutes. The resulting copolymer product was filtered, dried and weighed. The yield of the ethylene/propylene copolymer product was 112 grams.

In addition to the high yield, the composition of this invention was found to result in an almost immediate reaction on metering in the first portion of the chloro-derivative of the vanadium organophosphate component. The induction period for the composition of this invention was considerably faster than the composition which was prepared in the same manner as in Example 1 except that magnesium bis (diethyl) phosphate was used in place of the chloro-derivative of this magnesium salt and which was reacted under the same conditions as described above. This rapid induction period results in less residence time in the reaction vessel with concomitant increase in the throughput and productivity for a continuous reaction system. Consequently a reaction system of a given size and a given capital investment will have a greater productivity at a lower manufacturing cost than the vanadium organophosphate compositions without the halo derivative.

EXAMPLE 3

The same procedure is followed in Example 3 that was followed in Example 1 except that magnesium bis (di-2-bromoethyl) phosphate was substituted for the magnesium salt used in Example 1. The resulting vanadyl bis-(di-bromoethyl phosphate) is used in place of the chloro-derivative of the vanadium organophosphate composition of Example 1 in the copolymerization of ethylene and propylene in accordance with the procedure of Example 2. The induction period during this copolymerization reaction is believed to be even faster than that found in Example 2 for a yield of about 100 grams of ethylene/propylene copolymer.

EXAMPLE 4

Magnesium bis-(2-bromoethyl phosphite) having the formula:

is substituted for the magnesium salt of Example 3 and the same procedure is carried out to form vanadyl bis-(di-bromoethyl phosphite). The induction period and yield for the type of copolymerization reaction described in Example 2 are believed to be about the same as that of Example 3.

Similar beneficial results can be obtained by using other halo derivatives of the vanadium organophosphates described above in a manner such as is illustrated in the foregoing examples.

What is claimed is:

1. A composition of matter represented by the formula:

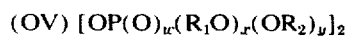

wherein OV is a vanadyloxy group, $R_1$ is hydrogen, an alkyl or cycloalkyl having 1 to 16 carbon atoms or an aryl having up to 16 carbon atoms, $R_2$ is haloalkyl, pseudohaloalkyl, halocycloalkyl or pseudohalocycloalkyl, having 1 to 16 carbon atoms or a haloaryl or pseudohaloaryl having up to 16 carbon atoms, said halo being fluoro, chloro, iodo or bromo and said pseudohalo being cyano, cyanato or hydroxyl, $w$ has a value of 0 or 1, $x$ has a value of 0 or 1, $y$ has a value of 1 or 2 and the sum of $x$ and $y$ is 2.

2. A composition of matter represented by the formula:

or polymers thereof wherein $R_1$ is an alkyl having 1 to 8 carbon atoms, $R_2$ is a $\beta$-haloalkyl having 2 to 8 carbon atoms, said halo being fluoro, chloro, iodo or bromo, $x$ has a value of 0 or 1, $y$ has a value of 1 or 2 and the sum of $x$ and $y$ is 2.

3. The composition of claim 2 wherein said halo is chloro.

4. The composition of claim 2 wherein $R_1$ is methyl, ethyl, propyl, butyl or mixtures thereof and $R_2$ is $\beta$-chloroethyl, $\beta$-chloropropyl, $\beta$-chlorobutyl, $\beta$-bromoethyl, $\beta$-bromopropyl, $\beta$-bromobutyl or mixtures thereof.

5. The composition of claim 2 wherein $R_1$ is ethyl and $R_2$ is chloroethyl.

6. The composition of claim 2 wherein $R_1$ is ethyl and $R_2$ is bromoethyl.

7. The composition of claim 2 wherein the composition of matter is a polymeric form represented by the formula:

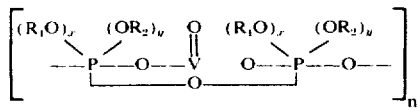

wherein $n$ is 2 to 6.

8. A process for producing a halo derivative of a vanadium organophosphate composition which comprises reacting in an aqueous solution a vanadyl salt wherein the vanadium is in its tetravalent form with a salt of an organophosphoric and, said salt having the formula:

$$M[OP(O)_w(R_1O)_x(OR_2)_y]_2$$

wherein M is beryllium, magnesium, calcium, zinc, strontium, cadmium, barium or mixtures thereof, $R_1$ is hydrogen, an alkyl or cycloalkyl having 1 to 16 carbon atoms or an aryl having up to 16 carbon atoms, $R_2$ is a haloalkyl, pseudohaloalkyl, halocycloalkyl or pseudohalocycloalkyl, having 1 to 16 carbon atoms or a haloaryl or pseudohaloaryl having up to 16 carbon atoms, said halo being fluoro, chloro, iodo or bromo and said pseudohalo being cyano, cyanato or hydroxyl, $w$ has a value of 0 or 1, $x$ has a value of 0 or 1, $y$ has a value of 1 or 2 and the sum of $x$ and $y$ is 2, at a temperature in the range of 0° to 200°C and recovering the resulting product from the aqueous solution.

9. The process of claim 8 wherein said vanadyl salt is vanadyl sulfate, chloride, bromide, iodide, oxalate, acetate or mixtures thereof.

10. The process of claim 8 wherein said halo is chloro.

11. The process of claim 8 wherein $R_1$ is methyl, ethyl, propyl, butyl or mixtures thereof and $R_2$ is $\beta$-chloroethyl, $\beta$-chloropropyl, $\beta$-chlorobutyl, $\beta$-bromoethyl, $\beta$-chloropropyl, $\beta$-bromobutyl or mixtures thereof.

12. A process for producing a halo derivative of a vanadium organophosphate which comprises reacting in an aqueous solution vanadyl sulfate with a salt of an organophosphoric acid, said salt having the formula:

wherein M is beryllium, magnesium, calcium, zinc, strontium, cadmium, barium or mixtures thereof, $R_1$ is an alkyl having 1 to 8 carbon atoms, $R_2$ is $\beta$-haloalkyl having 2 to 8 carbon atoms, said halo being fluoro, chloro, iodo or bromo, $x$ has a value of 0 or 1, $y$ has a value of 1 or 2 and the sum of $x$ and $y$ is 2 and separating the resulting reaction product from the aqueous solution.

13. The process of claim 12 wherein M is magnesium.

* * * * *